Nov. 25, 1969　　　F. H. ERNEST　　　3,480,020
MANICURE MEANS
Filed Nov. 23, 1966

FRANCES H. ERNEST
INVENTOR.

BY Edward M. Apple
ATTORNEY

United States Patent Office

3,480,020
Patented Nov. 25, 1969

---

3,480,020
MANICURE MEANS
Frances H. Ernest, 6546 Archdale Ave.,
Detroit, Mich. 48228
Filed Nov. 23, 1966, Ser. No. 596,701
Int. Cl. A45d 40/30
U.S. Cl. 132—88.5                                   2 Claims

ABSTRACT OF THE DISCLOSURE

This application discloses the means and method for measuring, mixing and applying material for building up, strengthening and elongating finger nails. The invention resides in the provision of a two piece, telescoping, calibrated, squeeze type receptacle, having an applicator discharge end and a template for use in applying the build up material to the free ends of the nails, and the method of applying the material.

---

This invention relates to the practice of manicuring and has particular reference to means and method of application of materials to a fingernail for the purpose of improving the nail.

An object of the invention is to provide means and method for increasing the length of a fingernail, whereby to improve the appearance and give the nail added body and strength.

Another object of the invention is to provide novel means and method of repairing a cracked, broken or otherwise damaged fingernail.

Another object of the invention is to provide a calibrated, squeeze type, receptacle for the measuring, mixing, dispensing and applying of fingernail build up materials.

Another object of the invention is to provide an adjustable two piece, squeeze type receptacle for measuring, mixing, dispensing and applying of fingernail build up materials.

Another object of the invention is to provide a temporary form or template for use in applying build up materials to the fingernail.

Another object of the invention is to provide a means and method of application of fingernail build up materials, which will obviate the necessity of using a dip stick or brush to apply and spread the material, thereby minimizing the possibility of over-extension of the material and damage to the cuticle and skin of the wearer.

Heretofore it has been the practice to apply build up material for fingernails without premixing the components of the build up material. That is, one component was applied to the nails and then the second component was applied to the nails, which said components were applied by dip sticks, brushes and the like. Such practice resulted in many variables and oftentimes left much of the material on the fingers and cuticles of the wearer which was difficult to remove. Further, it was difficult to get accurate definitive lines to the build up material, all of which resulted in anything but an aesthetic appearance. It is therefore an object of this invention to obviate such difficulties.

The foregoing and other objects and advantages of the invention will become more apparent as the description proceeds, reference being made from time to time to the accompanying drawing, forming part of the within disclosure, in which drawing.

Figure 1:
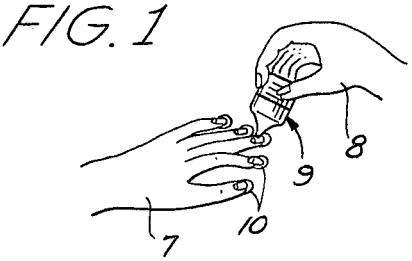
FIG. 1 is a perspective view, illustrating the manner of using the device in the application of a build up material to the fingernails of a hand.

Referring now more particularly to the drawing it will be understood that in the embodiment herein disclosed, the reference character 7 indicates the left hand, and the reference character 8 indicates the right hand of a human being having fingernails which are being built up with the means and method embodying the invention.

Figure 3:
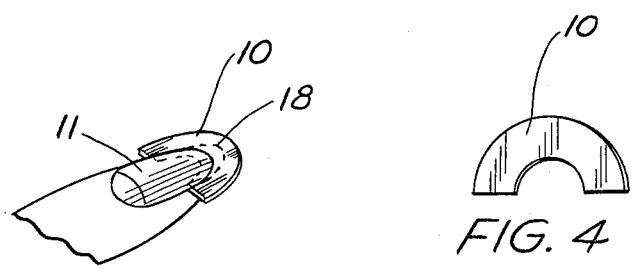
FIG. 3 is an enlarged perspective view of a finger showing the curved form or template in position under the free end of the nail.
Figure 4:
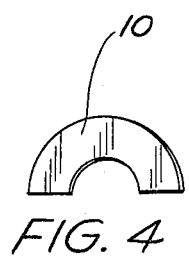
FIG. 4 is an enlarged plan view of the template, or form illustrated in FIG. 3.

The reference character 9 indicates, in general, the measuring and dispensing squeeze bottle, and the reference character 10 indicates, in general, the curved form or template which is extended underneath the free end of the fingernail 11, as shown in FIG. 3.

Figure 2:
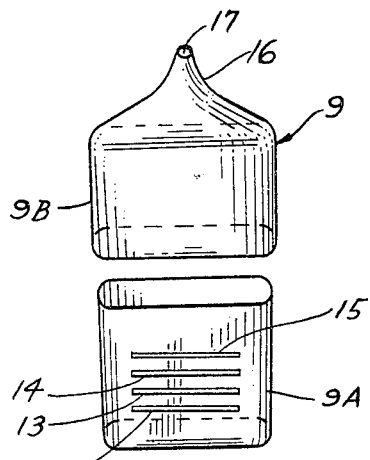
FIG. 2 is an enlarged and expanded view of the elements comprising the plastic squeeze bottle receptacle and dispensing member.

It will be noted in FIG. 2 that the measuring dispensing receptacle 9 consists of a bottom portion 9A and a cover portion 9B, both of which are made of a soft, pliable, plastic material and are arranged to telescope one another.

The portion 9A is provided with calibrations 12, 13, 14, and 15, which calibrations are provided to indicate the amount of material which has been mixed in the bottom portion 9A.

The upper section 9B of the squeeze bottle is provided with a reduced portion 16, which terminates in a dispensing aperture 17, through which the material is dispensed and applied to the fingernails.

The build up material which I use is preferably a methyl methacrylate powder and any suitable solvent, such as a liquid acrylic.

If it is desired to build up the five nails of one hand, enough liquid solvent is poured in the receptacle section 9A, to the depth of the first calibration from the bottom, then enough of the powdered methyl methacrylate is added to the solvent to the depth of the third calibration from the bottom of the receptacle.

If it is desired to build up all of the fingernails of both hands enough liquid solvent is poured into the receptacle to reach the second line from the bottom and sufficient powder is then added to reach the fourth line from the bottom.

The top portion 9B is then positioned over the receptacle 9A and the device may then be shaken until the powder is completely dissolved.

It will be understood that previous to the mixing of the build up material each of the fingernails to be treated is provided with one of the forms or templates 10, as shown in FIG. 1.

Each template 10 is preferably made of foil, backed with gummed paper. In applying the template to the fingernail, the gummed portion is first moistened and then the template is positioned beneath the nail and pressed into adherence with the finger below and around the nail. The receptacle 9 is then inverted, as shown in FIG. 1, and sufficient pressure is exerted on the walls of the receptacle to discharge a predetermined amount of the build up material on to the fingernail 11 (FIG. 3). The dispenser aperture 17 is held over the center of the nail to permit a sufficient amount of the build up material to flow from the dispenser onto the nail and to cover the nail, and the template 10 to build up the nail to the predetermined length, as indicated by the reference character 18 (FIG. 3). The build up material is allowed to set for approximately 20 minutes, after which the forms, or templates 10 may then be removed, leaving the fingernails with their elongated bodies.

It is believed that the operation of the means and the method is obvious from the foregoing description.

Having described my invention, what I claim and desire to secure by Letters Patent is:

1. Means for applying a lengthening material to a fingernail, including a template which is adapted to be positioned beneath a fingernail and to extend beyond the end thereof and a telescoping, adjustable, squeeze bottle containing said material, said bottle comprising an upper and lower section, said lower section having calibrations thereon, said upper section having an edge adapted to register with said calibrations, said last named piece having a reduced portion with a discharge opening therein.

2. The structure of claim 1, in which the said template comprises a flat, curved member having its central portion received under the free end of the fingernail and extending beyond the edges thereof and adapted to support the material applied to effect the desired length of the nail.

References Cited

UNITED STATES PATENTS

| | | | |
|---|---|---|---|
| 1,450,674 | 4/1923 | Marston | 220—8 |
| 2,085,446 | 6/1937 | Philippe | 222—386 |
| 2,220,363 | 11/1940 | Austin et al. | 132—73 |
| 2,793,789 | 5/1957 | Hodge | 222—47 |
| 2,897,826 | 8/1959 | Di Vito | 132—114 |

FOREIGN PATENTS 719,572  12/1959  Great Britain.

ROBERT PESHOCK, Primary Examiner

G. E. McNEILL, Assistant Examiner

U.S. Cl. X.R.

220—8